(12) United States Patent
Grubbs et al.

(10) Patent No.: US 7,202,910 B1
(45) Date of Patent: Apr. 10, 2007

(54) SIGNAL PROCESSING APPARATUS

(75) Inventors: Gary Dean Grubbs, Indianapolis, IN (US); Ricardo Haro, Indianapolis, IN (US); Rodger Anthony Diemer, Indianapolis, IN (US); Daniel Mark Hutchinson, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/959,083

(22) PCT Filed: Apr. 20, 2000

(86) PCT No.: PCT/US00/10724

§ 371 (c)(1),
(2), (4) Date: Feb. 14, 2003

(87) PCT Pub. No.: WO00/64151
PCT Pub. Date: Oct. 26, 2000

Related U.S. Application Data

(60) Provisional application No. 60/130,167, filed on Apr. 20, 1999.

(51) Int. Cl.
*H04N 7/18* (2006.01)
(52) U.S. Cl. .................. 348/555; 348/554; 348/556; 348/725
(58) Field of Classification Search ........ 348/553–555, 348/558, 725–726, 731, 736, 738; 725/68, 725/70, 100, 131, 139, 151
See application file for complete search history.

(56) References Cited

U.S. PATENT DOCUMENTS

| 5,283,653 | A | | 2/1994 | Citta | 348/725 |
| 5,557,337 | A | * | 9/1996 | Scarpa | 348/558 |
| 5,638,112 | A | * | 6/1997 | Bestler et al. | 725/151 |
| 5,852,476 | A | | 12/1998 | Limberg | 348/725 |
| 6,061,096 | A | * | 5/2000 | Limberg | 348/555 |
| 6,154,505 | A | * | 11/2000 | Konishi et al. | 375/321 |
| 6,545,723 | B1 | * | 4/2003 | Han | 348/555 |
| 6,550,063 | B1 | * | 4/2003 | Matsuura | 725/133 |
| 6,622,308 | B1 | * | 9/2003 | Raiser | 725/151 |

FOREIGN PATENT DOCUMENTS

EP 0808060 11/1997

* cited by examiner

*Primary Examiner*—Trang U. Tran
(74) *Attorney, Agent, or Firm*—Joseph J. Laks; Robert D. Shedd; Brian J. Cromarty

(57) ABSTRACT

An IF signal processing arrangement for processing both analog and digital signals is disclosed in the present application. The signal processing arrangement includes a signal source for providing one of digital and analog IF signals, a first SAW filter having an output for filtering the IF signal, digital signal processing circuitry coupled to the output for processing a filtered digital IF signal, and analog signal processing circuitry coupled to the output for processing which includes filtering a filtered analog signal.

19 Claims, 4 Drawing Sheets

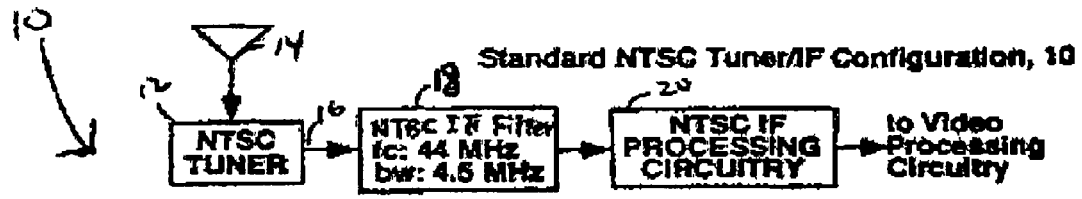

SIGNAL PROCESSING APPARATUS

This application claims the benefit of U.S. provisional application Ser. No. 60/130,167 filed Apr. 20, 1999, which is hereby incorporated herein by reference, and which claims the benefit under 35 U.S.C. § 365 of International Application PCT/US00/10724, filed Apr. 20, 2000, which was published in accordance with PCT Article 21(2) on Oct. 26, 2000 in English.

FIELD OF THE INVENTION

This application relates to intermediate frequency (IF) signal processing.

BACKGROUND INFORMATION

FIG. 1 is exemplary of a known tuner and IF signal processing apparatus indicated generally by the reference numeral 10. This tuner and IF signal processing apparatus 10 is for use with analog signals of a given broadcast standard, such as NTSC, PAL, and SECAM. This application describes NTSC application of the invention as an exemplary embodiment.

The Tuner/IF system 10 comprises a tuner 12 (with RF input 14 and IF output 16), IF filter(s) 18, and IF signal processor 20. The tuner's IF output 16 is at the standard frequency (e.g., desired channel spectrum centered at 44 MHz, picture carrier at 45.75 MHz, and sound carrier at 41.25 MHz). The IF filter(s) 18, which usually consist of one SAW (surface acoustic wave) filter for inter-carrier IF systems or two SAWF for parallel picture and sound IF systems, pass the desired channel and reject all others. In the parallel system one SAW filter passes the desired sound signal only, and the other passes the desired picture signal only. In either case, the filter characteristics include a "Nyquist Slope" through the double-side-band region of the picture IF spectrum. The filtered signal is applied to a conventional IF processing circuit 20 which performs such general functions as demodulation, AGC generation and the like and provides a processed baseband video output signal to a video processing circuit. The video processing circuit performs conventional functions such as color demodulation and other functions such as brightness, hue and tint control and the like.

With the advent of digital television (DTV), and specifically digital terrestrial television such as HDTV (high definition television), television receivers and their corresponding tuner/IF systems which provide proper tuning and filtering required for processing both NTSC and DTV signals are needed.

FIG. 2 illustrates a modification of the NTSC only system of FIG. 1 to provide a tuner/IF system 22 able to be used for both NTSC and DTV reception. In FIG. 2, a tuner 24 is modified to provide reception of both NTSC and DTV signals. Conversion signals are appropriately selected such that both types of signals produce a common IF signal frequency (e.g., about 44 MHz). Two SAW filters 26 and 28 are coupled in parallel with the output of the NTSC/DTV tuner. SAW BPF #1 26 has specific requirements for DTV signal reception and processing while SAW BPF #2 28 has specific requirements for NTSC signal reception and processing. For example, both SAW BPF #1 26 and SAW BPF #2 28 have a center frequency of about 44 MHz. However, SAW BPF #1 has a flat passband response, while SAW BPF #2 has the characteristics described above for the IF Filter(s) 18 in FIG. 1. The DTV filtered signal is applied to Digital IF processing circuitry 30. The digital IF processing circuitry 30 provides the filtered and processed DTV signal to Digital Link (i.e., decoder) circuitry (not shown). The NTSC filtered signal is applied to NTSC IF processing circuitry 32. The NTSC IF processing circuitry 32 provides the filtered and processed NTSC signal to video processing circuitry (not shown).

Due to passband flatness requirements for DTV signals, the DTV/NTSC tuner 24 in FIG. 2 has a wider bandwidth than the NTSC tuner 12 in FIG. 1. Consequently, the NTSC adjacent channel rejection of system 22 in FIG. 2 is not as good as system 10 in FIG. 1.

SUMMARY

An IF signal processing arrangement for processing both analog and digital signals is disclosed in the present application. The signal processing arrangement includes a signal source for providing one of digital and analog IF signals, a first SAW filter having an output for filtering the IF signal, digital signal processing circuitry coupled to the output for processing a filtered digital IF signal, and analog signal processing circuitry coupled to the output for processing which includes filtering a filtered analog signal.

BRIEF DESCRIPTION OF THE DRAWINGS

The invention is illustrated in the accompanying drawings, wherein:

FIG. 1 (Prior Art) is a block diagram of a conventional NTSC Tuner/IF configuration for processing NTSC television signals;

FIG. 2 is a block diagram of a parallel DTV/NTSC Tuner/IF configuration for tuning both DTV and NTSC signals;

FIG. 3 is a simplified block diagram of a dual DTV/NTSC Tuner/IF apparatus embodying the features of the present invention;

DETAILED DESCRIPTION OF THE PREFERRED EMBODIMENT

The present invention recognizes that passing the NTSC signal through SAW BPF #1 (i.e., connecting the input of SAW BPF #2 to the output of SAW BPF #1 instead of the tuner output) provides dramatically better adjacent channel and spurious signal rejection than system 10 in FIG. 1. This change is illustrated in FIG. 3. These benefits are significant as NTSC adjacent channel rejection (1st adjacent, 2nd adjacent, etc.) is a parameter that becomes significantly more important during the HDTV transition period in which VHF and UHF "taboos" (i.e., restrictions) on adjacent channel frequency allocations may be discarded or significantly reduced to make more spectral room available for the new HDTV terrestrial transmission channels while still accommodating current NTSC terrestrial channel allocations.

Figure 4:
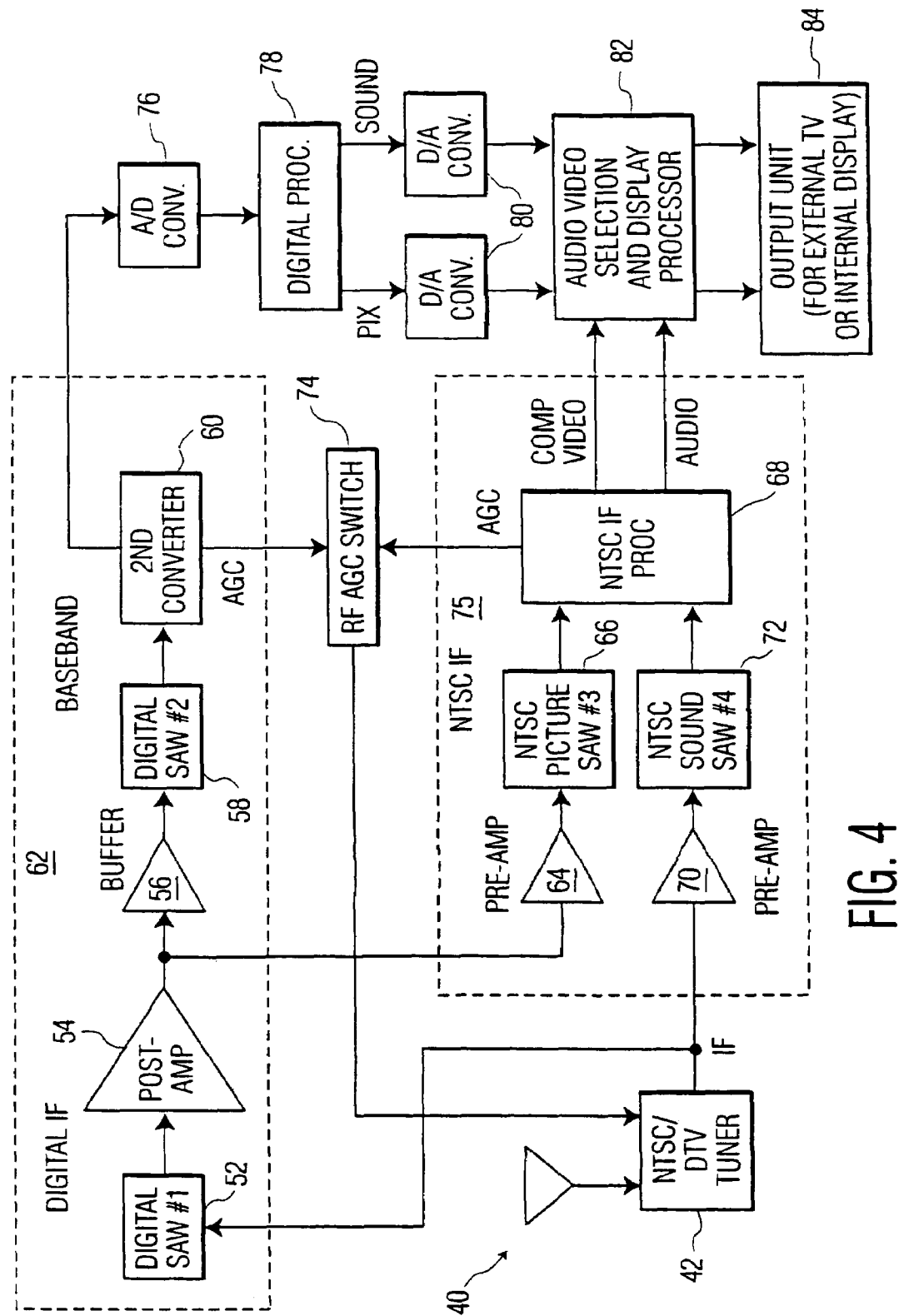
FIG. 4 is a detailed block diagram illustrating a practical implementation and additional features of the embodiment of FIG. 3.

A simplified diagram of the NTSC/DTV tuner/IF signal processor of the present invention is illustrated in FIG. 3 and indicated generally by the reference numeral 40. A more detailed diagram illustrating further features of the tuner/IF signal processor 40 of the present invention is shown in FIG. 4. FIGS. 3 and 4 show that the input to the NTSC SAW filter is taken from the output of a DTV SAW filter. Thus, the received NTSC signal is "double filtered".

Advantageously, the configurations of FIGS. 3 and 4 provide significant improvement in NTSC adjacent channel rejection and rejection of other out-of-band undesired signals as compared with the examples of FIGS. 1 and 2.

In FIG. 3, the NTSC/DTV tuner/IF signal processor 40 is provided with conversion frequencies which result in a common IF output signal frequency (e.g., 44 MHz) for both NTSC and DTV reception modes. The NTSC/DTV tuner/IF signal processor 40 includes a single conversion tuner 42 able to receive both NTSC and DTV signals. The tuner 42 provides received NTSC and DTV signals to a first SAW filter 44. The output of the first SAW filter 44 is provided to both a second SAW filter 46 and digital IF processing circuitry 48. The digital IF processing circuitry 48 receives the filtered signal from the first SAW filter 44 and provides a near baseband output signal to digital "link" or decoder circuitry (see FIG. 4).

When an NTSC signal is received, the received signal is provided to the first SAW filter 44. The first SAW filter 44 filters the received NTSC signal and provides the filtered signal to the second SAW filter 46. The IF signal thus passes through both filters for application to the NTSC IF processing circuitry 50 thereby reducing the undesirable effects of adjacent channel interference discussed above.

FIG. 4 is a practical implementation of FIG. 3, and includes more details. With the current state-of-the-art technology, the filter characteristics required for the DTV IF signal cannot be achieved with a single SAW filter as depicted by SAW BPF #1 44 in FIG. 3. That is, the selectivity requirements cannot be met without excessive insertion loss. The excessive insertion loss would ultimately result in inferior system noise figure or severe linearity requirement for a preamplifier. In practice, the required filter and performance characteristics are achieved by cascading two identical SAW filters, Digital SAW #1 and Digital SAW #2, with inter-stage amplifiers Post-amp 54 and Pre-amp 56 as shown in FIG. 4. Thus, when a DTV signal is selected by the NTSC/DTV tuner 42, it is processed through the cascaded circuits comprised of Digital SAW #1, Post-amp 54, Pre-amp 56, and Digital SAW #2 58, to input of a $2^{nd}$ converter circuit 60.

The Post-amp 54 provides an optimum load impedance for Digital SAW #1 52 and compensates for its loss. Similarly, the Pre-amp 56 provides an optimum source impedance for Digital SAW #2 58 and compensates for its loss. The output of the 2nd converter circuit 60 is converted from an analog signal to a digital signal by the A/D Converter 76, the digital processor 78 demodulates the digital signal and separates the picture and sound signals, and the signals are converted back to analog format by a pair of digital-to-analog converters 80.

When an NTSC signal is selected by the NTSC/DTV tuner 42, there are separate paths for the picture and sound signals. The picture signal is processed through Digital SAW #1 52 and Post-amp 54 before being processed through the Pre-amp 64 and conventional NTSC Picture SAW #3 66 to the NTSC processor 68. Since the sound carrier frequency is at the band-edge of Digital SAW #1 52 and the sloped frequency response through the sound channel will have undesirable effects (see FIG. 7), the sound signal does not pass through Digital SAW #1 and Post-amp 54. Instead the sound signal is processed through Pre-amp 70 and NTSC Sound SAW #4 72 to the NTSC IF processor 68. The Pre-amp 64 provides an optimum source impedance for NTSC Picture SAW #3 66 and compensates for its loss.

Similarly, the Pre-amp 70 provides the optimum source impedance for NTSC Sound SAW #4 and compensates for its loss. Processing the picture signal through Digital SAW # 1 52 and Post-amp 54 provides the advantage of better selectivity (e.g., adjacent channel rejection and spurious signal immunity). The NTSC IF processor demodulates the picture and sound signals and provides composite video and audio baseband outputs.

Both the Digital IF $2^{nd}$ Converter 60 and NTSC IF Processor generate RF AGC control signals that are applied to a RF AGC Switch 74. The output of the RF AGC Switch 74 controls the gain of the NTSC/DTV tuner 42. Similarly, the NTSC IF processor 68 and D/A converter 80 picture and sound signals are applied to an Audio-Video Selection and Display Processor 82 whose output drives an internal or external display unit 84. When the system is installed in a new location, an automatic setup procedure determines which type of signal (NTSC or DTV) is present on each channel and stores the results in memory (not shown). Then whenever a new channel is selected, the system microprocessor (not shown) uses the data stored in memory to properly set the RF AGC switch 74 and the Audio-Video Selection Switch 82.

Figure 5:
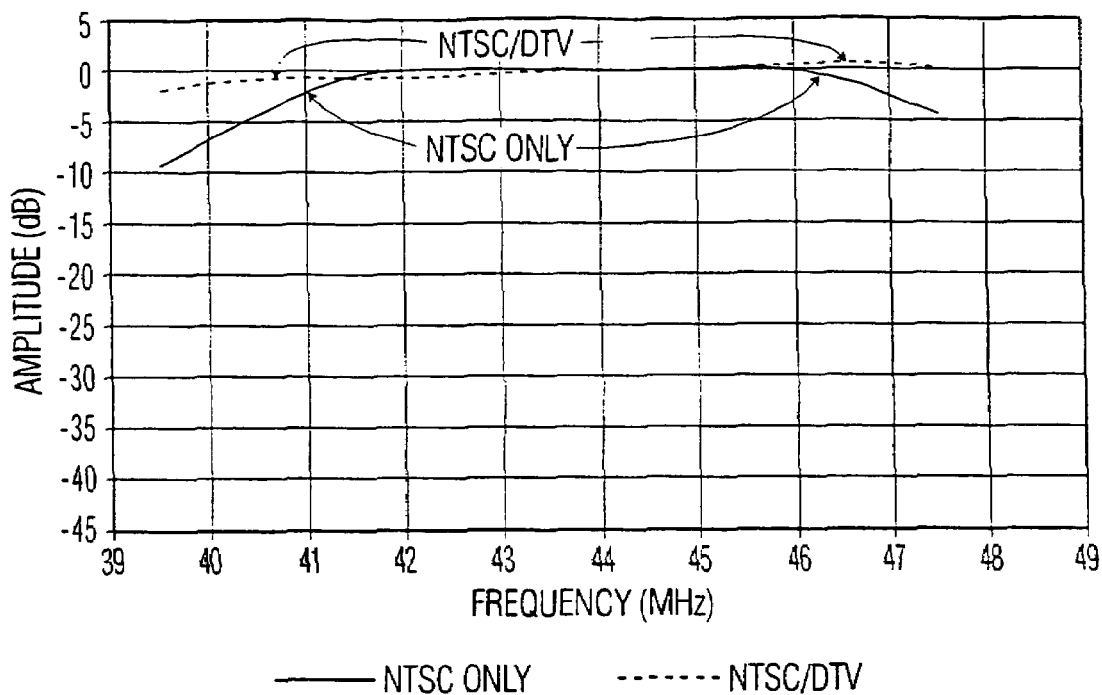
FIG. 5 is a tuner frequency response diagram comparing the response of a conventional NTSC only tuner with that of the embodiments of FIGS. 3 and 4.

FIG. 5 compares the frequency response of the NTSC only tuner 12 (FIG. 1) and the NTSC/DTV tuner 42 (FIG. 4) of the present invention. The wider bandwidth (i.e., poorer selectivity) of the NTSC/DTV tuner is a negative consequence of being able to maintain the passband flatness requirements for DTV signals.

Figure 6:
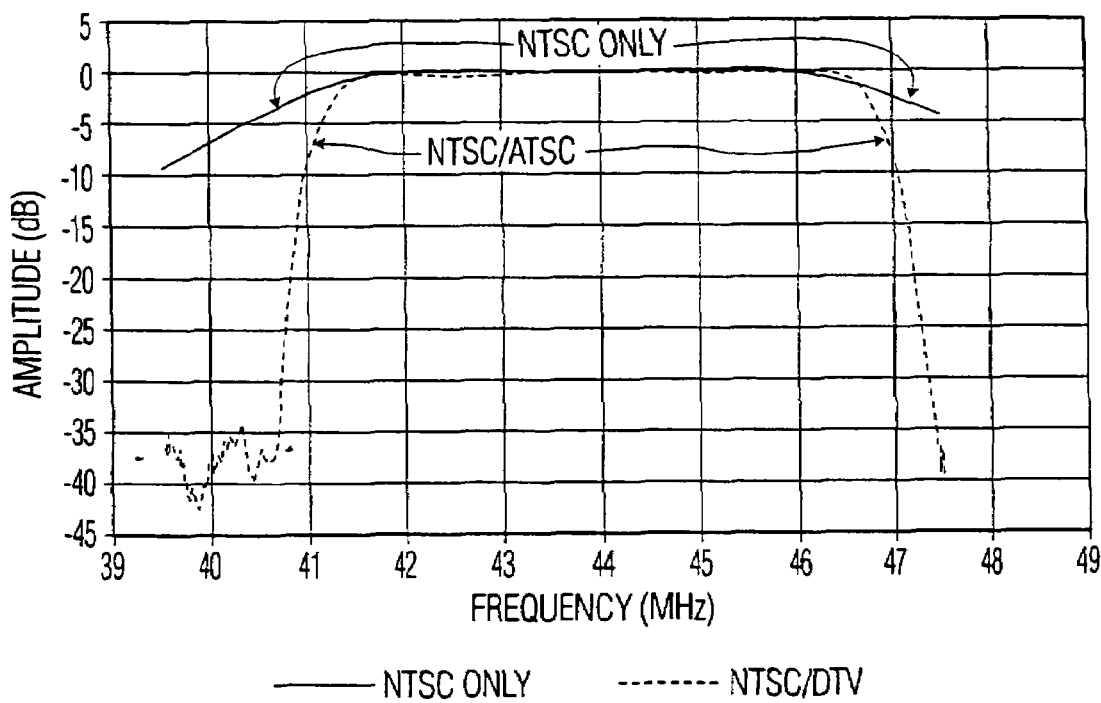
FIG. 6 is a tuner frequency response diagram comparing the selectivity of a conventional NTSC only receiver to that of the embodiments of FIGS. 3 and 4 of the present invention.

FIG. 6 compares the frequency response of the NTSC only tuner 12 (FIG. 1) to the frequency response through the NTSC/DTV tuner 42, Digital SAW #1 52, and Post-amp 54 (FIG. 4). Since the frequency response of the subsequent circuits is the sate for both systems, this illustrates the huge advantage in passing the NTSC picture IF signal through Digital SAW #1 44 and Post-amp 54 instead of directly to the input of the Pre-amp 64 in the NTSC IF 50. Doing so more than compensates for the relatively poor selectivity of the NTSC/DTV tuner 42. The selectivity of the present invention, as seen in FIG. 6, is indicative of excellent adjacent channel rejection and spurious signal immunity.

It will be noted that the embodiment of FIG. 4 has two SAW filters in the DTV signal path, and the NTSC picture signal is only passed through the first of these two SAW filters. This is the preferred configuration because it achieves the selectivity requirements with negligible degradation to system noise figure. That is passing the NTSC picture signal through both SAW filters in the DTV signal path is not necessary from a selectivity standpoint, and the additional degradation in system noise figure may be significant.

Figure 7:
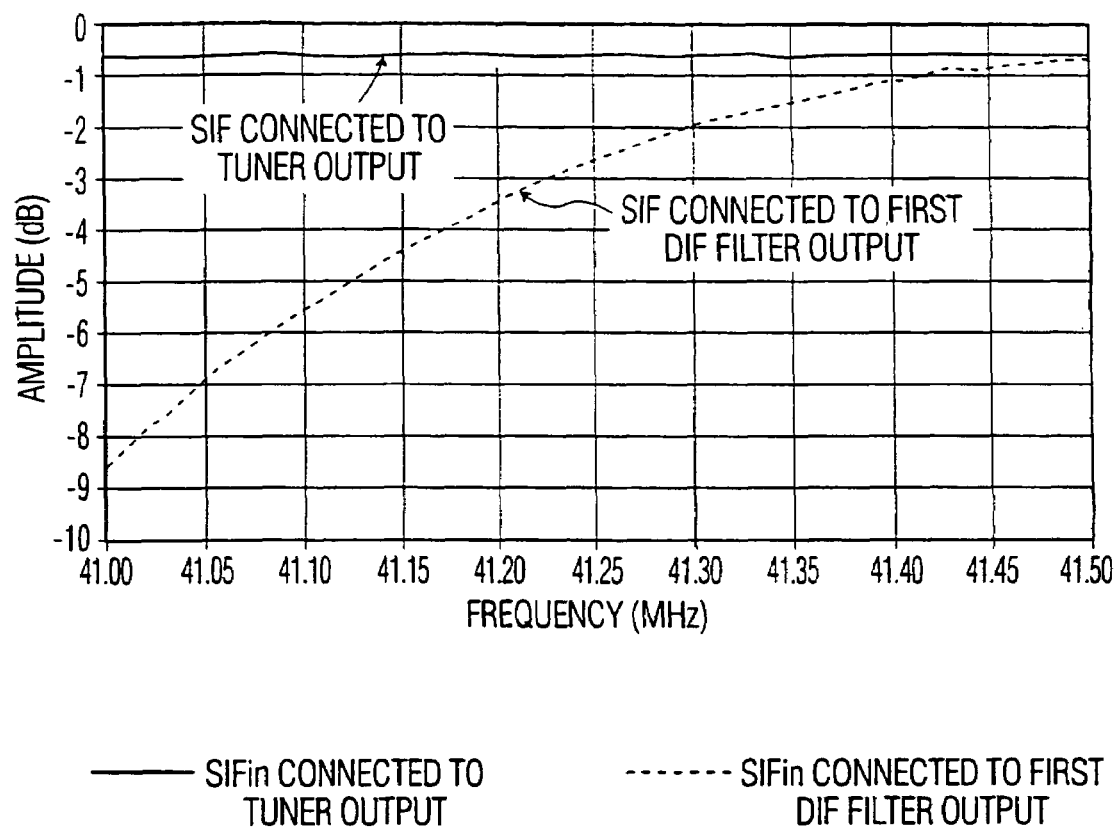
FIG. 7 is a tuner frequency response diagram illustrating certain aspects of sound intermediate frequency (SIF) processing for the embodiment of FIG. 4.

FIG. 7 is a graph illustrating the effects of passing the NTSC sound IF signal through the Digital SAW #1 52 as opposed to bypassing the Digital SAW #1 52. The results obtained by passing the NTSC sound signal through the Digital SAW #1 52 differ drastically from the results obtained by bypassing the Digital SAW #1 52. As can be seen from this figure, when the sound IF signal is provided from the single conversion tuner 42 directly to the NTSC sound SAW filter 72, the frequency response through the sound channel is constant. Such is not the case for passing the NTSC sound IF signal through the Digital SAW #1 52. It is thus beneficial for the NTSC sound IF signal to bypass the Digital SAW #1 52.

Although the present invention has been described with a certain degree of particularity, it is understood that the present disclosure has been made by way of examples and that changes in details of arrangement may be made without departing from the spirit the invention. For example, the analog television signals may include PAL and SECAM television signals, and the digital television (DTV) signals may include QAM and digital VSB television signals. In addition, the DTV signal processing after Digital SAW #2 might utilize another approach (e.g., A/D conversion and digital demodulation immediately after Digital SAW #2).

We claim:

1. A signal processing arrangement comprising:
    a signal source for providing one of digital and analog IF signals;
    a first SAW filter coupled to said signal source and having an output for filtering said IF signal;
    digital signal processing means coupled to said output for processing a filtered digital IF signal; characterized by and
    first analog signal processing means coupled to said output for processing only the picture component of the analog IF signal, and
    second analog signal processing means coupled to said signal source for processing only a sound component of an analog IF signal, bypassing therefore the first SAW filter which includes filtering a filtered analog signal.

2. The arrangement according to claim 1, wherein:
    said digital signal processing means includes a second SAW filter for filtered said IF signal.

3. The arrangement according to claim 1, wherein said first analog signal processing means includes a third SAW filter for filtering the picture component of the filtered analog IF signal.

4. The arrangement according to claim 2, wherein said first analog processing means includes a third SAW filter.

5. The arrangement according to claim 4, wherein said digital signal processing means is being decoupled from a subsequent signal processing circuit while said digital IF signal is applied thereto.

6. The arrangement according to claim 4 wherein said first analog processing means is being decoupled from a subsequent signal processing circuit while said digital IF signal is applied thereto.

7. The arrangement according to claim 1 wherein said analog IF signal is an NTSC IF signal.

8. An IF signal processing apparatus comprising:
    a single conversion tuner for receiving IF signal having picture and sound signals and including one of analog and digital content;
    a first SAW filter connected to said single conversion tuner for filtering the received IF signals, said first SAW filter having an output;
    digital IF circuitry connected to said output of said first SAW filter for receiving and digitally processing the filtered IF signals;
    first analog IF circuitry also connected to said output of said first SAW filters for analog processing of only the picture component of the filtered IF signals, and said analog IF circuitry performing a second filtering operation on the filtered IF signal;
    second analog IF circuitry coupled to said output of said second conversion tuner for processing only the sound component of the analog IF signal, bypassing therefore the first SAW filter.

9. The apparatus according to claim 8, wherein said digital IF circuitry includes a second SAW filter for performing the second filtering operation on the filtered IF signal.

10. The apparatus according to claim 8, wherein said first analog IF circuitry includes a third SAW filter for performing said second filtering operation on the filtered IF signal.

11. The apparatus according to claim 9, wherein said first analog IF circuitry includes a third SAW filter for performing said second filtering operation on the filtered IF signal.

12. The apparatus according to claim 11, wherein said digital IF circuitry is able to determine whether the filtered IF signal includes analog or digital content, said digital IF circuitry blocking the filtered IF signal from passing there through upon determining the filtered IF signal includes the analog content.

13. The apparatus according to claim 11, wherein said first analog IF circuitry is able to determine whether the filtered IF signal includes analog or digital content, said first analog IF circuitry blocking the filtered IF signal form passing there through, upon determining said filtered IF signal includes the digital content.

14. The apparatus according to claim 8, wherein said digital IF circuitry includes a cascade connection of said first digital SAW, a postamplifier, a buffer amplifier, a second SAW filter and a second converter.

15. The apparatus according to claim 14, wherein said first analog IF circuitry includes a buffer amplifier having an input connected to said output of said postamplifier, an analog SAW and a analog IF processor for producing a composite video signal and an audio signal to be provided to display means.

16. The apparatus according to claim 15, wherein said second analog IF circuitry further includes a second buffer amplifier connected to receive an analog sound signal from said single conversion tuner and an analog sound SAW for filtering said analog sound signal and providing the filtered analog sound signal to said analog IF processor.

17. A method of filtering IF signals including one of analog and digital content, said method comprising the steps:
    receiving the IF signal by a single conversion tuner;
    filtering the said IF signal in a first SAW filter;
    providing the filtered F signal to both a digital IF circuit and an analog IF circuit;
    providing the IF signal received directly from said single conversion tuner to a second SAW filter for processing only the sound component of the analog IF signal in case of the analog IF signal, bypassing therefore the first SAW filter.

18. The method of claim 17, wherein said first SAW filter Filters a picture component of said IF signal, in the case that an analog signal is received.

19. The method of claim 18, further comprising the step of amplifying the filtered IF signal prior to providing the filtered IF signal to both the digital IF circuit and the analog IF circuit.

* * * * *